US009963362B2

(12) United States Patent
Quicksall et al.

(10) Patent No.: US 9,963,362 B2
(45) Date of Patent: May 8, 2018

(54) METHOD FOR ELECTROCHEMICAL BROMIDE AND/OR CHLORIDE REMOVAL

(71) Applicant: Southern Methodist University, Dallas, TX (US)

(72) Inventors: Andrew Quicksall, Dallas, TX (US); Xiaofei Cui, Dallas, TX (US)

(73) Assignee: Southern Methodist University, Dallas, TX (US)

(*) Notice: Subject to any disclaimer, the term of this patent is extended or adjusted under 35 U.S.C. 154(b) by 8 days.

(21) Appl. No.: 13/836,775

(22) Filed: Mar. 15, 2013

(65) Prior Publication Data

US 2014/0263094 A1  Sep. 18, 2014

(51) Int. Cl.
C02F 1/00     (2006.01)
C02F 1/48     (2006.01)
C02F 1/72     (2006.01)
C02F 1/76     (2006.01)
C02F 1/78     (2006.01)
C02F 1/467    (2006.01)
B23H 3/02     (2006.01)
C25B 9/00     (2006.01)
C25C 3/16     (2006.01)
C25D 17/00    (2006.01)
C02F 1/66     (2006.01)
C02F 101/12   (2006.01)
C02F 103/18   (2006.01)

(52) U.S. Cl.
CPC ............ C02F 1/4674 (2013.01); C02F 1/66 (2013.01); C02F 2101/12 (2013.01); C02F 2103/18 (2013.01); C02F 2201/4618 (2013.01); C02F 2201/46145 (2013.01); C02F 2209/06 (2013.01)

(58) Field of Classification Search
USPC .............................. 210/192, 748.01, 748.17
See application file for complete search history.

(56) References Cited

U.S. PATENT DOCUMENTS 5,385,650 A *   1/1995  Howarth et al. ............. 205/619
5,445,717 A *   8/1995  Karki et al. ................. 205/471
5,750,289 A *   5/1998  Kejha ........................... 429/233
5,755,974 A *   5/1998  McBrayer et al. ........... 210/739
5,868,911 A *   2/1999  Blum et al. .................. 204/237
6,960,301 B2   11/2005  Bradley et al.
7,300,591 B2   11/2007  Ikematsu et al.
7,354,509 B1    4/2008  Mehl et al.
2002/0014410 A1*  2/2002  Silveri et al. ................. 204/412
2002/0146625 A1* 10/2002  Probst ........................... 429/241
2012/0160706 A1   1/2012  Poirier et al.

OTHER PUBLICATIONS

University of Cantebury (Determination of Chloride Ion Concentrastion by Gravimetry; 2 pages).*
USEPA Method 9253 (Experiment on Determination of Chlorides; 2003; 12 pages).*
Tang et al. (Quantitative Determination of Chloride, Chlorite, and Chlorate Ions in a Mixture by Successive Potentiometric Titrations, Anal. Chem., 1980, v. 52, pp. 1430-1433).*

* cited by examiner

Primary Examiner — Dirk Bass
Assistant Examiner — Hayden Brewster
(74) Attorney, Agent, or Firm — Edwin S. Flores; Daniel J. Chalker; Chalker Flores, LLP

(57) ABSTRACT

The present invention provides apparatuses, systems and methods for the controllable oxidation of bromide into bromine either directly through electrochemical (EC) anodes or indirectly through electrochemically generated oxidants.

8 Claims, 2 Drawing Sheets

METHOD FOR ELECTROCHEMICAL BROMIDE AND/OR CHLORIDE REMOVAL

CROSS-REFERENCE TO RELATED APPLICATIONS

None.

TECHNICAL FIELD OF THE INVENTION

The present invention relates generally to wastewater treatment and more specifically, to processes and apparatuses for the electrochemical decontamination of wastewater.

STATEMENT OF FEDERALLY FUNDED RESEARCH

None.

INCORPORATION-BY-REFERENCE OF MATERIALS FILED ON COMPACT DISC

None.

BACKGROUND OF THE INVENTION

Without limiting the scope of the invention, its background is described in connection with electrochemical removal of bromide from water.

Bromide removal is necessary before wastewater can be discharged into natural water bodies to avoid post-discharge trihalomethanes formation. Bromate formation must be minimized during bromide conversion due to its well-established detrimental health effects and difficulty of removal from water once generated.

Typical sources of bromide contamination are coal-fired power plant wastewater and oil field wastewater. The present invention includes applications in power and oil/gas industries. In coal-fired power plants, bromine is present in the organic matter precursor of coal and is often added during combustion to oxidize elemental mercury. During the burning of coal and oxidation of mercury, bromine is converted to bromide and is found in coal-fired power plant wastewater, and may be discharged to natural water.

Surface and groundwater are a major source of drinking water, and natural organic matter is present in significant quantities in most sources. Disinfection is typically a necessary step to generate quality drinking water for the public, and chlorination is an extensively used method. If bromide is present during chlorination, it can be oxidized by chlorine into hypobromous acid (HOBr) which can react to form various brominated forms of trihalomethanes (THMs) which may cause cancer in the gastro-intestinal tract, spontaneous abortion, birth defects, and still births. Removal of brominated THMs is well known to be technically difficult.

U.S. Patent Application Publication No. 2012/0160706, entitled, "Apparatus and Method for Electrochemical Treatment of Wastewater," discloses an electro-coagulation unit for removing contaminants with at least one anode and at least one cathode and an electro-oxidation unit for oxidizing contaminants wherein oxidants are electrochemically generated.

U.S. Pat. No. 7,354,509, entitled, "Wastewater Treatment System," discloses a wastewater treatment system comprising means of decontaminating wastewater; means of measuring control parameters of the wastewater; means for controlling said decontamination; and a programmable logic controller. The user is able to receive control parameter data and control the various processes of the wastewater treatment system from a remote location.

U.S. Pat. No. 7,300,591, entitled, "Wastewater Treating Method and Wastewater Treating Apparatus," discloses a wastewater treating technique for treating nitrogen compounds in a for-treatment wastewater by an electrochemical technique, wherein at least portions of a pair of electrodes is immersed in the for-treatment wastewater; a material of one electrode constituting an anode is an insoluble conductor; and a material of the other electrode constituting a cathode is an element in the group VIII of the periodic table, a conductor containing the element in the group VIII, or a conductor covered with the element in the same group or the conductor containing the element in the same group.

U.S. Pat. No. 6,960,301, entitled, "Leachate and Wastewater Remediation System," discloses a compact portable modular wastewater treatment system which integrates several processing technologies to provide a substantially purified water source. A wastewater stream is sent through an initial filtration step. The filtered wastewater is then subjected to electrocoagulation and then further filtered. The resulting stream containing substantially only organics is then treated in an advanced oxidation process which can include passing an electrical current through the water during the oxidation process. The partially treated water is then passed through ion-exchange columns to polish ammonium and other contaminants. The ion-exchange columns are cycled through regeneration cycles to provide a continuous ion-exchange medium. The ammonium rich brine solution used in regeneration is subjected to an ammonium destruct process and then reused in regenerating ion-exchange columns. The water can then be sent through a final disinfection oxidation process to destroy or inactivate pathogens and/or remove any remaining colorants or odor to provide a water source suitable for almost any use.

SUMMARY OF THE INVENTION

The present invention provides an electrogeneration system for the oxidation of bromide to bromine in an aqueous electrolyte solution comprising: a treatment chamber comprising at least one electrochemical cell to contain an aqueous electrolyte solution and an inlet and an outlet, wherein the aqueous electrolyte solution comprises bromide ions, chloride ions, or a mixture of bromide and chloride ions; at least one anode in the treatment chamber; and at least one cathode in the treatment chamber; a power supply in communication with the at least one anode and the at least one cathode to generate an electric current sufficient to generate bromine, chlorine, chloride ions, or a combination thereof, and reduce bromate formation in the aqueous electrolyte solution; an electrolyte reservoir for holding the aqueous electrolyte solution connected to the inlet; an aqueous electrolyte solution flow controller to control a selected volume of the electrolyte solution between the electrolyte reservoir and the electrochemical cell; and a pH adjusting mechanism comprising an acid reservoir for holding an acid connected to the treatment chamber, a pH monitor in communication with the treatment chamber; and a control unit in communication with the pH monitor and the acid reservoir to adjust the pH by adding the acid from the acid reservoir to the aqueous electrolyte solution.

The apparatus may further include a bromine detection device in communication with the aqueous electrolyte solution to monitor the formation of bromine and/or a separation device to separate the bromine molecules from the aqueous electrolyte solution. The at least one anode and the at least one cathode are independently an array or a ribbon mesh and may include a ruthenium oxide composition, a tantalum oxide composition, or a ruthenium oxide and a tantalum oxide composition.

The chloride ions may be present in the aqueous electrolyte solution and/or generated at the at least one anode and be at a concentration of between 20-80 ppm or more, e.g., 20, 21, 22, 23, 24, 25, 30, 35, 40, 45, 50, 55, 60, 65, 70, 75, 80, 85, 90, 95, 100, and incremental variations thereof. Similarly, the bromide ions concentration may be between 20-100 ppm or more, e.g., 20, 21, 22, 23, 24, 25, 30, 35, 40, 45, 50, 55, 60, 65, 70, 75, 80, 85, 90, 95, 100, 110, 120, 130, 140, 150, 200 ppm, and incremental variations thereof.

Some embodiments may also include sulfate ions either in the aqueous electrolyte solution and/or or added thereto and the concentration may be between 700-2000 ppm $SO_4^{-2}$ and peroxodisulfate is generated at the at least one anode. Similarly the pH may be adjusted to 0.05, 0.1, 0.5, 1.0, 1.5, 2.0, 2.5, 3.0, 3.5, 4.0, 4.5, 5.0, 5.5, 6.0, 7.0, 8.0, 9.0, and incremental variations thereof.

The power supply may be adjusted to provide a current between 0.01 to $5.0\times10^5$ A and the voltage between 0.1 to 1000 V and incremental variations thereof sufficient to generate bromine, chlorine, chloride ions, or a combination thereof and reduce bromate formation in the aqueous electrolyte solution.

The present invention also provides a method for the oxidation of bromide to bromine in a for-treatment aqueous electrolyte solution by an electrochemical technique by providing a treatment chamber comprising at least one electrochemical cell to contain an aqueous electrolyte solution and an inlet and an outlet, wherein the aqueous electrolyte solution comprises bromide ions, chloride ions, or a mixture of bromide and chloride ions; at least one anode in the treatment chamber; and at least one cathode in the treatment chamber; connecting a power supply to the at least one anode and the at least one cathode to generate an electric current sufficient to generate bromine, chlorine, chloride ions, or a combination thereof and reduce bromate formation in the aqueous electrolyte solution; providing an electrolyte reservoir for holding the aqueous electrolyte solution connected to the inlet; adjusting an aqueous electrolyte solution flow controller to flow a selected volume of the electrolyte solution between the electrolyte reservoir and the electrochemical cell; providing a pH adjusting mechanism comprising an acid reservoir for holding an acid connected to the treatment chamber, a pH monitor in communication with the treatment chamber; and a pH control unit in communication with the pH monitor and the acid reservoir to adjust the pH by adding the acid from the acid reservoir to the aqueous electrolyte solution; adjusting the pH to between 0.5-6.0 with the pH control unit; and adjusting the power supply to provide a current between 0.01 to $5.0\times10^5$ A and the voltage is between 0.1 to 1000 V sufficient to generate bromine, chlorine, chloride ions, or a combination thereof and reduce bromate formation in the aqueous electrolyte solution; and oxidizing bromide to bromine through oxidation at the one or more anodes, oxidizing indirectly bromide to bromine through oxidation through electrochemically generated oxidants or both.

The present invention provides an electrogeneration system for the oxidation of bromide to bromine in an aqueous electrolyte solution having a treatment chamber comprising at least one electrochemical cell to contain an aqueous electrolyte solution and an inlet and an outlet, wherein the aqueous electrolyte solution comprises bromide ions, chloride ions or a mixture of bromide and chloride ions; at least one anode in the treatment chamber; and at least one cathode in the treatment chamber; a power supply in communication with the at least one anode and the at least one cathode to generate an electric current sufficient to generate bromine, chlorine, chloride ions or a combination thereof and reduce bromate formation in the aqueous electrolyte solution; and an aqueous electrolyte solution source connected to the inlet to provide the aqueous electrolyte solution to the treatment chamber.

An apparatus for treating wastewater in a power plant comprising an electrogeneration system for the oxidation of bromide to bromine in an aqueous electrolyte solution comprising: a treatment chamber comprising at least one electrochemical cell to contain an aqueous electrolyte solution and an inlet and an outlet, wherein the aqueous electrolyte solution comprises bromide ions, chloride ions or a mixture of bromide and chloride ions; at least one anode in the treatment chamber; and at least one cathode in the treatment chamber; a power supply in communication with the at least one anode and the at least one cathode to generate an electric current sufficient to generate bromine, chlorine, chloride ions, or a combination thereof and reduce bromate formation in the aqueous electrolyte solution; an electrolyte reservoir for holding the aqueous electrolyte solution connected to the inlet; an aqueous electrolyte solution flow controller to control a selected volume of the electrolyte solution between the electrolyte reservoir and the electrochemical cell; and a pH adjusting mechanism comprising an acid reservoir for holding an acid connected to the treatment chamber, a pH monitor in communication with the treatment chamber; and a control unit in communication with the pH monitor and the acid reservoir to adjust the pH by adding the acid from the acid reservoir to the aqueous electrolyte solution.

An apparatus for generating a bromine compound in the wastewater of a power plant comprising an electrogeneration system for the oxidation of bromide to bromine in an aqueous electrolyte solution comprising: a treatment chamber comprising at least one electrochemical cell to contain an aqueous electrolyte solution and an inlet and an outlet, wherein the aqueous electrolyte solution comprises bromide ions, chloride ions or a mixture of bromide and chloride ions; at least one anode in the treatment chamber; and at least one cathode in the treatment chamber; a power supply in communication with the at least one anode and the at least one cathode to generate an electric current sufficient to generate bromine, chlorine, chloride ions or a combination thereof and reduce bromate formation in the aqueous electrolyte solution; an electrolyte reservoir for holding the aqueous electrolyte solution connected to the inlet; an aqueous electrolyte solution flow controller to control a selected volume of the electrolyte solution between the electrolyte reservoir and the electrochemical cell; and a pH adjusting mechanism comprising an acid reservoir for holding an acid connected to the treatment chamber, a pH monitor in communication with the treatment chamber; and a control unit in communication with the pH monitor and the acid reservoir to adjust the pH by adding the acid from the acid reservoir to the aqueous electrolyte solution.

A method for treating bromide in a for-treatment wastewater by an electrochemical technique comprising the steps of providing a treatment chamber comprising at least one electrochemical cell to contain an aqueous electrolyte solution and an inlet and an outlet, wherein the aqueous electrolyte solution comprises bromide ions, chloride ions or a mixture of bromide and chloride ions; at least one anode in the treatment chamber; and at least one cathode in the treatment chamber; connecting a power supply to the at least one anode and the at least one cathode to generate an electric current sufficient to generate bromine, chlorine, chloride ions or a combination thereof and reduce bromate formation in the aqueous electrolyte solution; providing an electrolyte reservoir for holding the aqueous electrolyte solution connected to the inlet; adjusting an aqueous electrolyte solution flow controller to flow a selected volume of the electrolyte solution between the electrolyte reservoir and the electrochemical cell; providing a pH adjusting mechanism comprising an acid reservoir for holding an acid connected to the treatment chamber, a pH monitor in communication with the treatment chamber; and a pH control unit in communication with the pH monitor and the acid reservoir to adjust the pH by adding the acid from the acid reservoir to the aqueous electrolyte solution; adjusting the pH to between 0.5-6.0 with the pH control unit; and adjusting the power supply to provide a current between 0.01 to $5.0 \times 10^5$ A and the voltage is between 0.1 to 1000 V sufficient to generate bromine, chlorine, chloride ions or a combination thereof and reduce bromate formation in the aqueous electrolyte solution; and oxidizing bromide to bromine through oxidation at the one or more anodes, oxidizing indirectly bromide to bromine through oxidation through electrochemically generated oxidants or both.

A process for electrochemical oxidation of bromide to bromine providing a treatment chamber comprising at least one electrochemical cell to contain an aqueous electrolyte solution and an inlet and an outlet, wherein the aqueous electrolyte solution comprises bromide ions, chloride ions or a mixture of bromide and chloride ions; at least one anode in the treatment chamber; and at least one cathode in the treatment chamber; connecting a power supply to the at least one anode and the at least one cathode to generate an electric current sufficient to generate bromine, chlorine, chloride ions or a combination thereof and reduce bromate formation in the aqueous electrolyte solution; providing an electrolyte reservoir for holding the aqueous electrolyte solution connected to the inlet; adjusting an aqueous electrolyte solution flow controller to flow a selected volume of the electrolyte solution between the electrolyte reservoir and the electrochemical cell; providing a pH adjusting mechanism comprising an acid reservoir for holding an acid connected to the treatment chamber, a pH monitor in communication with the treatment chamber; and a pH control unit in communication with the pH monitor and the acid reservoir to adjust the pH by adding the acid from the acid reservoir to the aqueous electrolyte solution; adjusting the pH to between 0.5-6.0 with the pH control unit; and adjusting the power supply to provide a current between 0.01 to $5.0 \times 10^5$ A and the voltage is between 0.1 to 1000 V sufficient to generate bromine, chlorine, chloride ions or a combination thereof and reduce bromate formation in the aqueous electrolyte solution; and oxidizing bromide to bromine through oxidation at the one or more anodes, oxidizing indirectly bromide to bromine through oxidation through electrochemically generated oxidants or both.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figures 1A, 1B:
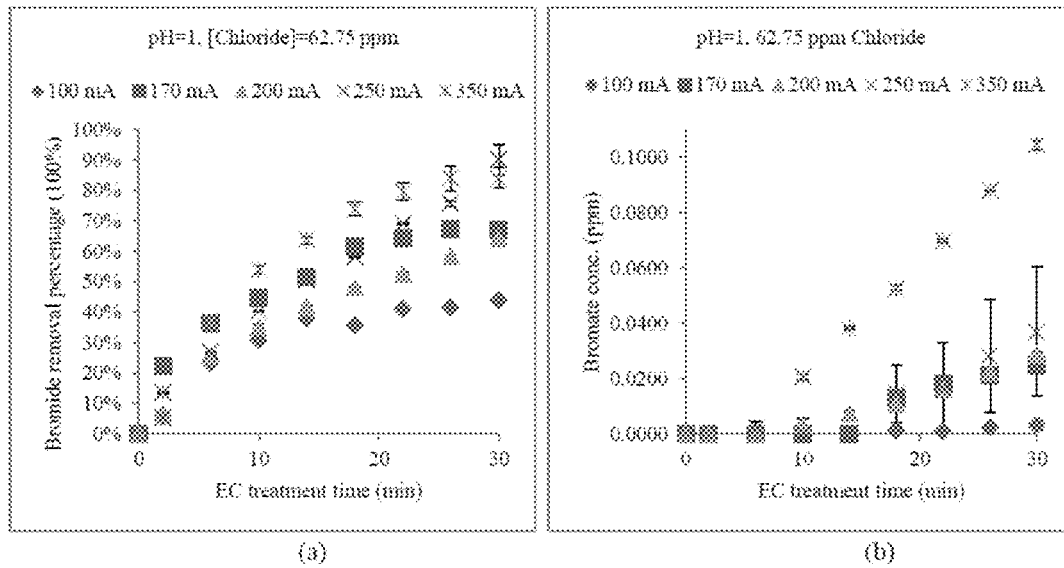
FIG. 1A is a graph of bromide removal percentage over time during EC treatment.
FIG. 1B is a graph of bromate generation over time during EC treatment of SPPW with pH=1 and chloride concentration of 62.75 ppm at different currents.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention provides a method and apparatus for the removal of bromide before its discharge into source water. The present invention provides methods of reducing and/or preventing the generation of carcinogenic brominated trihalomethanes (THMs). The present invention oxidizes bromide into bromine either directly by the electrochemical (EC) anodes, or indirectly by electrochemically generated oxidants such as chlorine molecules. With its controllable oxidation power, the present invention can ensure that only bromine is generated from bromide oxidation since uncontrolled, excessive oxidation can generate bromate.

The present invention provides a controllable oxidation of bromide into bromine either directly through electrochemical (EC) anodes or indirectly through electrochemically generated oxidants. The EC device used in the first step of the present invention is composed of a power supply, anode(s), cathode(s), and electrolytes which, together, form a circuit.

One embodiment of the present invention provides a two-step strategy to remove bromide which includes a first step of oxidizing bromide anions into bromine molecules followed by separation of bromine molecules from the wastewater. As the latter occurs as a dissolved gas, this process is relatively straightforward by a variety of physical means such as heated air purging. Since bromide can be oxidized into bromate and bromate has long been found carcinogenic, it is preferable to have an oxidation technique with controllable oxidation power to avoid bromate formation. The present invention provides an electrochemical (EC) technique to accomplish this.

EC techniques have been described as clean, flexible, and powerful methods for environmental treatment. A typical EC device is composed of a power supply, anode(s), cathode(s), and electrolytes which, together, form a circuit. When electrified, the anodes would tend to acquire electrons and, therefore, oxidize compounds; the cathodes tend to lose electrons and, therefore, reduce compounds. During an EC process, both direct oxidation on anodes and indirect oxidation through electrochemically generated oxidants (such as hypochlorite), can occur. Possible reactions that can contribute to bromide oxidation are below:

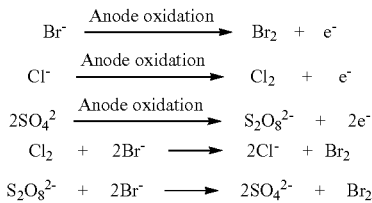

It should be noted that oxidation through chlorine species that are electrochemically generated onsite is superior to oxidation through directly added chlorine species regarding THMs generation. A previous study shows that THMs were reduced by 50% when disinfection was carried out through EC-generated chlorine.

Electrochemical oxidation power can be controlled by the energy input reflected by the values of voltage and current. Oxidation power and energy input are positively correlated. Optimal conditions should exist for best bromide removal performance during EC treatment while eliminating bromate formation. As an example, it has been reported that low pH can inhibit the formation of bromate. Other factors besides pH can also affect EC removal of bromide. Voltage is an obvious parameter to optimize during electrochemical experiments. Further, concentrations and varieties of compounds, such as chloride and sulfate that can contribute to indirect EC oxidation of bromide into bromine molecules, can also be varied to promote optimal conditions.

Studies were conducted with simulated power plant wastewater using the major components: $F^-$ (5.46 ppm), $Cl^-$ (62.75 ppm), $Br^-$ (51.8 ppm), $NO_2^-$ (2.44 ppm), $NO_3^-$ (5.6 ppm), and $SO_4^{-2}$ (1172 ppm). The concentrations for this simulated power plant wastewater were provided by Alabama Power, Birmingham, Ala. An EC device was used in these studies and included a power supply, anode(s) to acquire electrons, cathode(s) to lose electrons and electrolytes which, together, form a circuit (not shown). The electrodes were included in an electrode array, which consists of four panel electrodes made of ELGARD™ 100 Anode Ribbon Mesh (CORRPRO Company Inc.), a 0-500 mA DC power supply, and a 600-ml polypropylene beaker (Core Pharmer). The mesh is composed of ruthenium oxide and tantalum oxide sintered to an expanded titanium mesh substrate. Two of the panels are cathodes and two are anodes. The dimension of each panel is 75 mm×90 mm, and the corresponding surface area is 85 cm². Distance between two adjacent panels is 12 mm. Depth of electrode immersion in 600 ml aqueous sample in the polypropylene beaker is 64 mm. The potential and current ranges are 0-60 V and 0-0.5 A. The potential values depend on the value of current and conductivity of treated samples. It will be readily understood by the skilled inventor that these parameters are guides for this embodiment of the present invention and that other embodiments will have different parameters. In preliminary studies, EC power (represented by the currents), pH of the simulated power plant wastewater, and chloride concentration were varied to explore the optimal conditions for bromide removal. EC performances under different conditions were evaluated from two perspectives: bromide removal percentage and bromate generation.

FIG. 1A is an image of a graph that indicates that bromide removal percentage increased with the EC currents except when EC current was 170 mA. Bromide removal at 170 mA was higher than that at 200 mA during the 30 min of EC treatment, and was higher than that at 250 mA before 22 min. FIG. 1B is an image of a graph that indicates that in general the bromate generation increased with EC currents, although it should be noted that bromate generations at 170 mA, 200 mA, and 250 mA didn't differ significantly. Since the discharge limit for bromate in finished water by the Environmental Protection Agency is 0.01 ppm, the highest bromide removal percentage ($P_{max}$) before the bromate concentration reached 0.01 ppm was used to evaluate the best EC current. $P_{max}$ values were 44%, 51%, 42%, and 37% for 100 mA, 170 mA, 200 mA, 250 mA, and 350 mA. Therefore, 170 mA was selected as the best EC current.

Figures 2A, 2B:
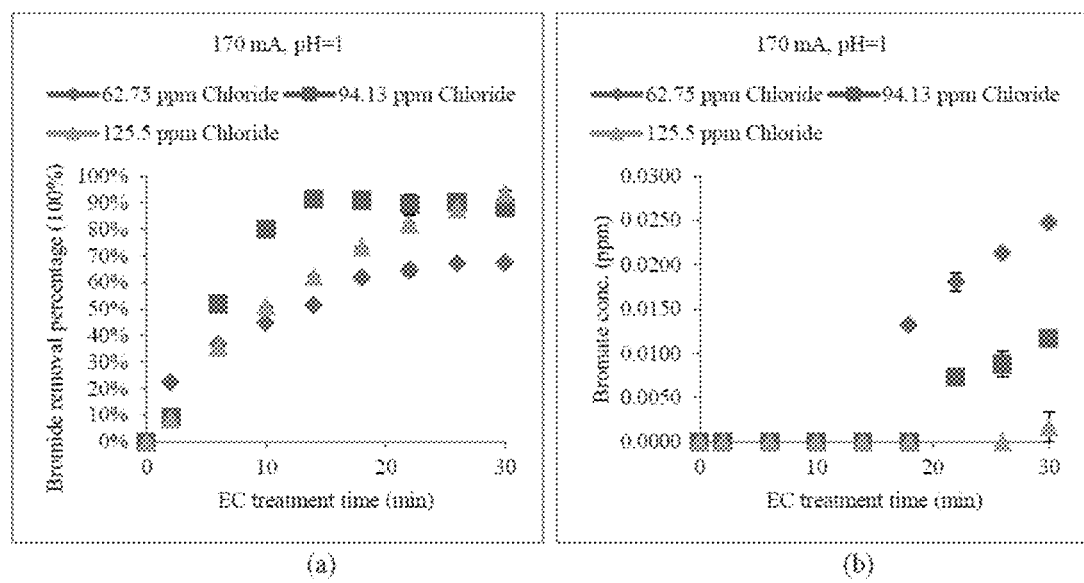
FIG. 2A is a graph of bromide removal percentage over time during EC treatment.
FIG. 2B is a graph of bromate generation over time during EC treatment of SPPW at 170 Ma with pH=1, and with varying chloride concentration.

FIGS. 2A and 2b are images of graphs of EC treatment of simulated power plant wastewater at 170 Ma with pH=1, and with varying chloride concentration. FIG. 2A is a graph of Bromide removal percentage over time during EC treatment. FIG. 2A is a graph of Bromate generation over time during EC treatment. The values of Pmax were 51%, 91%, and 73% for 62.75 ppm chloride, 94.13 ppm chloride, and 125.5 ppm chloride. Apparently, the best chloride concentration should be 94.13 ppm. FIG. 2A indicates that with 94.13 ppm chloride, the maximum bromide removal was achieved after 14 min, and for 62.75 ppm chloride, the maximum removal was realized after 26 min. However, at 125.5 ppm chloride, bromide removal kept increasing during the 30 min of EC treatment. More work is still needed to determine the detailed effects of chloride on EC removal of bromide and on generation of bromate.

Figures 3A, 3B:
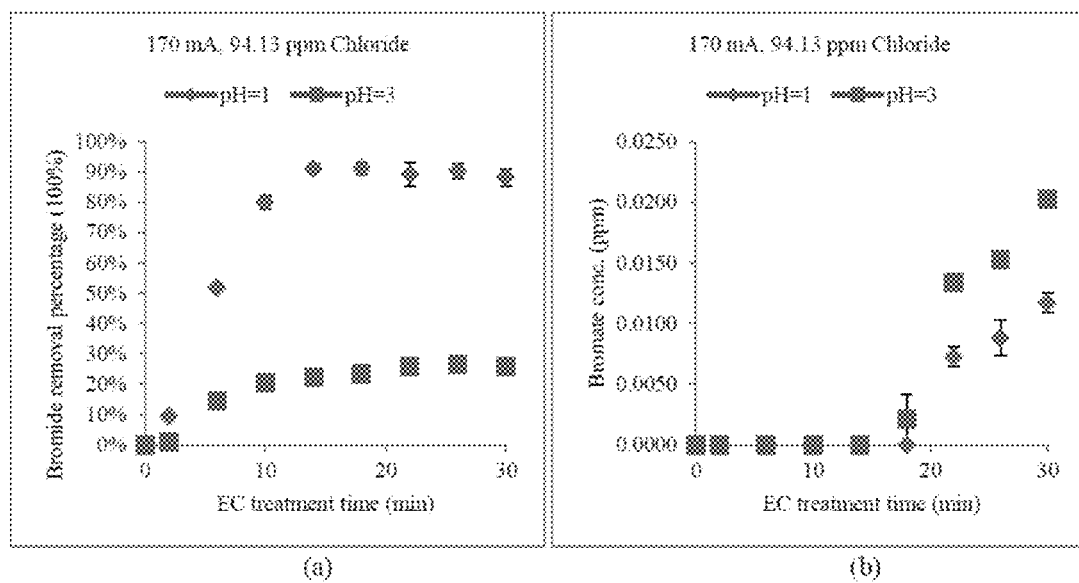
FIG. 3A is a graph of bromide removal percentage over time during EC treatment.
FIG. 3B is a graph of bromate generation over time during EC treatment of SPPW at 170 mA, with 94.13 ppm chloride and varying pH.

FIGS. 3A and 3B are images of graphs of EC treatment of SPPW at 170 mA, with 94.13 ppm chloride and varying pH. FIG. 3A is a graph of bromide removal percentage over time during EC treatment. FIG. 3B is a graph of bromate generation over time during EC treatment. FIGS. 3A and 3B show that EC bromide removal performance with pH=1 was better than that with pH=3 regarding both bromide removal percentage and bromate generation. However, lower pH requires adding more acid during treatment which will increase the operational cost. Therefore, more pH values need to be tried to determine the optimal pH value that can not only remove high percentages of bromide, and minimize bromate generation, but also keep the cost low.

The present invention provides a wastewater treating apparatus including a treatment vessel which includes a treatment chamber having an inlet and an outlet of a wastewater, a set of electrodes oppositely arranged to be partially immersed in the for-treatment wastewater of the treatment chamber, a power supply to energize the electrodes a controller to control the power supply, etc. Agitation mechanisms may be disposed in the treatment vessel to agitate the contents. The wastewater may be in communication with a wastewater supply from a power plant, water processing plant, or on-site treatment of water such as wastewater, sewage, pools, and hot tubs, or in the recovery of precious metals.

The present invention uses 2 electrodes, electrode arrays, or electrode sets. The first electrode, first electrode array, first electrode set may be made of, for example, iron (Fe) or a conductor covered with the iron as an element in the group VIII of a periodic table, or a conductor containing the element in the group VIII, or a conductor covered with the element in the same group or a conductor containing the element in the same group. The second electrode, second electrode array, second electrode set may be a noble metal electrode made of platinum (Pt) or a mixture of platinum and iridium (Ir), or made of an insoluble conductor covered with such en element. According to one embodiment, the iron (Fe) is used as the element in the group VIII of the periodic table, or the conductor containing the element in the group VIII, or the conductor covered with the element in the same group, or the conductor containing the element in the same group. In addition, cobalt (Co), nickel (Ni) or the like may be used as long as it is a conductor containing the element in the group VIII. The electrode may be a noble metal electrode, or made of the insoluble conductor covered with such an element. In addition, a ceramic-based conductor such as a ferrite, a carbon-based conductor, a stainless steel, or the like may be used. According to the embodiment, the mixture of platinum and iridium (platinum/iridium) is used.

During treatment the wastewater power supply is turned on by the controller to apply a positive potential to the first electrode (anode) and a negative potential to the second electrode (cathode). As a result of the application of the potentials, electrons generated on the first electrode side constituting the anode are fed to the second electrode side constituting the cathode, and the nitric acid ions contained as the nitrate nitrogen in the for-treatment wastewater are reduced to nitrous acid ions. Further, electrons are fed to the second electrode side constituting the cathode to reduce the nitrate nitrogen reduced to the nitrous-acid ions to ammonia. Thus, the reaction at the first electrode (anode) is seen below:

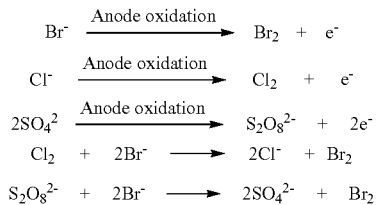

The power supply is turned on and controlled by the controller to apply a positive potential to the first electrode (anode) and a negative potential to the second electrode (cathode) to modulate the reaction. The power supply may be regulated to provide current from 1 to $5.0 \times 10^5$ A and a voltage of between 0.1 to 1000 V to achieve maximum percentage of bromide conversion. The power supply may be regulated to provide current densities of between 0.1-500 $mA/cm^2$ or up to 500 $A/m^2$ depending on the particular application and specific reaction chamber parameters.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method for the oxidation of ions in an aqueous electrolyte solution by an electrochemical technique comprising the steps of:

providing a treatment chamber comprising at least one electrochemical cell to contain an aqueous electrolyte solution and an inlet and an outlet, wherein the aqueous electrolyte solution comprises 20-200 ppm bromide ions, 20-200 ppm chloride ions or a mixture of 20-200 ppm bromide ions and 20-200 ppm chloride ions;

at least one anode in the treatment chamber; and
at least one cathode in the treatment chamber;
a pH adjusting mechanism connected to the treatment chamber comprising an acid reservoir for holding an acid and supplying the acid to the treatment chamber to maintain the pH between 0.1 to 2.0;
a pH monitor in communication with the treatment chamber to determine the pH of the aqueous electrolyte solution;
a bromine detector in communication with the treatment chamber to detect bromine in the aqueous electrolyte solution;
an aqueous electrolyte solution flow controller in communication with the treatment chamber and the inlet, the outlet or both to control the flow of the aqueous electrolyte solution into the treatment chamber; and
a control unit in communication with
the aqueous electrolyte solution flow controller to control the flow of the electrolyte solution,
the at least one anode to control the oxidization reaction,
the at least one cathode to control the reduction reaction,
the bromine detector to determine the bromine concentration,
the pH monitor to determine the pH, and
the acid reservoir to control the pH and to oxidize bromide to bromine;
connecting a power supply to the control unit to supply power to the at least one anode and the at least one cathode to generate an electric current sufficient to generate bromine, chlorine, or a combination thereof and reduce bromate formation in the aqueous electrolyte solution;
providing an electrolyte reservoir for holding the aqueous electrolyte solution connected to the inlet and the aqueous electrolyte solution flow controller;
adjusting the aqueous electrolyte solution flow controller to flow a selected volume of the electrolyte solution between the electrolyte reservoir and the electrochemical cell;
adjusting the pH of the aqueous electrolyte solution to between 0.1 to 2.0 with the pH adjusting mechanism by adding the acid from the acid reservoir to the aqueous electrolyte solution;
adjusting the power supply to provide an electrical current between 0.01 to $5.0 \times 10^5$ A and a voltage between 0.1 to 1000 V sufficient to generate bromine, chlorine or a combination thereof in the aqueous electrolyte solution;
oxidizing bromide ions to bromine, chloride ions to chlorine, or both, through oxidation at the one or more anodes or oxidizing bromide ions to bromine indirectly through generating electrochemically generated intermediate oxidants that oxidize bromide ions to bromine, chloride ions to chlorine, or both;
determining the amount of bromine produced using the bromine detector;
adjusting a bromide ion concentration to between 20-100 ppm;
generating chlorine at the at least one anode;
adjusting the chloride ion concentration to between 62 and 125 ppm;
determining a $SO_4^{-2}$ concentration;
adjusting the $SO_4^{-2}$ concentration to between 700-2000 ppm; and
generating peroxodisulfate at the at least one anode.

2. The method of claim 1, wherein the at least one anode and the at least one cathode are independently an array or a ribbon mesh.

3. The method of claim 1, wherein the electrical current is between 100 and 350 mA.

4. The method of claim 1, wherein the electrical current is about 170 mA, the chloride ion concentration is about 94 ppm and the pH is about 1.

5. A method for eliminating bromide ions, chloride ions, or both, in a wastestream comprising the steps of:
providing a treatment chamber having and an inlet and an outlet and comprising at least one electrochemical cell with a wastestream that comprises 20-200 ppm bromide ions, 20-200 ppm chloride ions or a mixture of 20-200 ppm bromide ions and 20-200 ppm chloride ions;
at least one anode and at least one cathode in the treatment chamber;
a pH adjusting mechanism connected to the treatment chamber comprising an acid reservoir for holding an acid and supplying the acid to the treatment chamber to maintain the pH between 0.1 to 2.0;
a pH monitor in communication with the treatment chamber to determine the pH of the wastestream;
a wastestream flow controller in communication with the treatment chamber and the inlet, the outlet or both to control the flow of the wastestream into the treatment chamber; and
a control unit in communication with:
the wastewater flow controller to control the flow of the electrolyte solution;
the at least one anode to control the oxidization reaction;
the at least one cathode to control the reduction reaction;
the pH monitor to determine the pH of the wastestream; and
the acid reservoir to control the pH of the wastestream;
connecting a power supply to the control unit to supply power to the at least one anode and the at least one cathode to generate an electric current sufficient to generate bromine, chlorine, or a combination thereof and reduce bromate formation in the wastestream;
adjusting the flow controller to flow a selected volume of the wastestream between the reservoir and the electrochemical cell;
adjusting the pH of the wastestream to between 0.1 to 2.0 with the pH adjusting mechanism by adding the acid from the acid reservoir to the wastestream;
adjusting the power supply to provide an electrical current between 0.01 to $5.0 \times 10^5$ A and a voltage between 0.1 to 1000 V sufficient to generate bromine, chlorine or a combination thereof and reduce bromate formation in the wastestream; and
oxidizing bromide ions to bromine, or chloride ions to chlorine, or both, through oxidation at the one or more anodes or oxidizing bromide ions to bromine or chloride ions to chlorine, or both, indirectly through generating electrochemically generated intermediate oxidants that oxidize bromide ions to bromine or chloride ions to chlorine, or both.

6. The method of claim 5, wherein the at least one anode and the at least one cathode are independently an array or a ribbon mesh.

7. The method of claim 5, wherein the electrical current is between 100 and 350 mA.

8. The method of claim 5, wherein the electrical current is about 170 mA, the chloride ion concentration is about 94 ppm and the pH is about 1.

* * * * *